United States Patent
Borman et al.

(10) Patent No.: US 6,708,195 B1
(45) Date of Patent: Mar. 16, 2004

(54) COMPOSITE LOCKING OF OBJECTS IN A DATABASE

(75) Inventors: Samuel David Borman, Southsea (GB); Kevin Patrick Corrigan, Waterlooville (GB); Dale Robinson Hewitt, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/267,586

(22) Filed: Mar. 12, 1999

(30) Foreign Application Priority Data

Oct. 2, 1998 (GB) ............................................. 9821370

(51) Int. Cl.$^7$ ................................................ G06F 9/00
(52) U.S. Cl. ............................ 709/102; 709/100; 707/8
(58) Field of Search ................................ 709/315, 316, 709/104; 707/8, 103

(56) References Cited

U.S. PATENT DOCUMENTS

| | | | |
|---|---|---|---|
| 4,977,498 A | 12/1990 | Rastegar et al. ............. | 364/200 |
| 5,161,227 A | 11/1992 | Dias et al. ................... | 395/650 |
| 5,551,046 A | 8/1996 | Mohan et al. ............... | 395/800 |
| 5,634,128 A | 5/1997 | Messina ....................... | 395/682 |
| 5,692,178 A | * 11/1997 | Shaughnessy ............... | 395/608 |

FOREIGN PATENT DOCUMENTS

GB 2321540 7/1998 ............. G06F/9/46

* cited by examiner

Primary Examiner—John Follansbee
Assistant Examiner—The Thanh Ho
(74) Attorney, Agent, or Firm—McGinn & Gibb, PLLC; Gail H. Zarick, Esq.

(57) ABSTRACT

In a multi-user environment, a method of controlling access to objects is required, such that updates performed by one user are not overwritten by simultaneous updates by another user. There is provided a method of controlling access to objects and containers, each representing a group of objects, in a multi-user environment whereby lock states of the objects and lock states of the containers are stored in a computer system, said method comprising the steps of: accepting a request for access to an object or a container; deciding access based on the lock state for that object or container, the lock state of a container if the request is for an object contained within that container, and the lock state of objects grouped within a container if the request is for a container object; and sending a message to the requester granting or denying access to said object or container object. Updates performed by one user on an object or a container are not overwritten by simultaneous updates by another user. The above supports units of work in a GUI session where a unit of work could be updating a single object, viewing a single object or copying or deleting a container of objects. This extends to manipulating entire voice applications which consist of many containers and other objects.

21 Claims, 2 Drawing Sheets

Lock Table 40

| Container 42 | Object 44 | Session 46 | Count 48 | Pointer 52 |
|---|---|---|---|---|
| | | | | |
| | | | | |
| | | | | |
| | | | | |

Non-exclusive lock record 50A

| Count 56A | Session 54A | Pointer 52A |
|---|---|---|
| | | |

Non-exclusive lock record 50B

| Count 56B | Session 54B | Pointer 52B |
|---|---|---|
| | | |

Non-exclusive lock record 50B

| Count 56C | Session 54C | Pointer 52C |
|---|---|---|
| | | |

Lock Table 40

| Container 42 | Object 44 | Session 46 | Count 48 | Pointer 52 |
|---|---|---|---|---|
|  |  |  |  |  |
|  |  |  |  |  |
|  |  |  |  |  |
|  |  |  |  |  |
|  |  |  |  |  |

Non-exclusive lock record 50A

| Count 56A | Session 54A | Pointer 52A |
|---|---|---|
|  |  |  |

Non-exclusive lock record 50B

| Count 56B | Session 54B | Pointer 52B |
|---|---|---|
|  |  |  |

Non-exclusive lock record 50B

| Count 56C | Session 54C | Pointer 52C |
|---|---|---|
|  |  |  |

Figure 2

COMPOSITE LOCKING OF OBJECTS IN A DATABASE

FIELD OF INVENTION

This invention relates to composite locking of objects and containers.

BACKGROUND OF INVENTION

In a multi-user environment, a method of controlling access to objects is required, such that updates performed by one user are not overwritten by simultaneous updates by another user. Typically, multiple read-access is allowed but only single-user update is required. Additionally, objects are collected into numerous containers (e.g. databases). It is a requirement to take account of the lock state of the individual object and the lock state of the relevant container when requesting access.

SUMMARY OF INVENTION

According to one aspect of the invention there is provided a method of controlling access to objects and containers, each representing a group of objects, in a multi-user environment whereby lock states of the objects and lock states of the containers are stored in a computer system, said method comprising the steps of: accepting a request for access to an object or a container; deciding access based on the lock state for that object or container, the lock state of a container if the request is for an object contained within that container, and the lock state of objects grouped within a container if the request is for a container; and sending a message to the requester granting or denying access to said object or container. Updates performed by one user on an object or a container are not overwritten by simultaneous updates by another user. The above aspect of the invention supports units of work in a GUI session where a unit of work could be updating a single object, viewing a single object or copying or deleting a container of objects. This extends to manipulating entire voice applications which consist of many containers and other objects.

A further advantage is provided by storing the lock states for containers and lock states for objects in a common format, for instance, in the same table. A common data structure enables the same locking operations to be performed on any lock entry in the table irrespective of whether it is for an object or a container.

The lock state for a container or an object maybe stored in a record (lock table entry) in a table and the record (lock table entry) may comprise a container name field and an object name field containing string expressions. When a lock is placed on an object the object name and the container name may be stored in the lock table entry. When a lock is placed on a container the container name may be stored in the lock table entry and the object name field may be made null. In this way when a request for access to an object is made, the container for that object may be found in the record holding the name of the object and the lock state for that container found in the record for that container which has a null object name field. Similarly when a request for access to a container is made, all the lock states for objects with the same container name in their records maybe acquired.

The names are stored as strings (not pointers) to objects or containers, this allows the locking of conceptual objects, e.g. a conceptual container which has no existence in the file system. As far as the locking mechanism is concerned there is no difference between a conceptual container (such as a voice application) and a real container (such as a database); all locking operations may be performed on both types of container.

The lock state stored in the record or lock table entry is an exclusive lock, it provides the ability to work with an object or container without any interference from other user sessions, hence it is exclusive. Updates performed by a user are not over written by simultaneous updates by another user. A container or object may either be exclusively locked or not and advantageously a count value is stored for the exclusive lock state to allows multiple acquisition of lock by same user/session for GUI windows. This is useful for obtaining multiple views of the same object or performing parallel operations on the same object by the same user.

A The lock state may comprise a non-exclusive lock state associated with a user session. This allows multiple user access to an object in a controlled read-only manner so that concurrent exclusive access is prohibited.

The non-exclusive lock state may comprise a read lock. This allows another session to acquire a read lock on the same object or container but not an exclusive lock.

The non-exclusive lock state may comprise a write lock. This allows another session to acquire a write lock on the same object or container but not an exclusive lock.

More than one non-exclusive lock state may be associated with a lock entry. This provides that multiple users can acquire non-exclusive locks on a lock entry.

Multiple non-exclusive lock states may be stored in a linked list comprising linked records associated with record or lock table entry. In this way any number of sessions can acquire non-exclusive lock states for a particular object.

Each linked record may comprise a unique session id and count value for the lock. This allows multiple locks to be acquired by the same session. For example, voice segment editing and playing in the same the session; both editing and playing would require a lock and would be performed using the same session so that a single lock was involved but with an incremented use count. Storing a unique session identifier allows the identity of the session user who has initiated a non-exclusive lock to be found; this allows notification of current lock owners (readers) in the event of acquisition of a higher priority lock (e.g. a write for that object).

BRIEF DESCRIPTION OF DRAWINGS

In order to promote a fuller understanding of this and other aspects of the present invention, an embodiment will now be described, by way of example only, with reference to the accompanying drawings in which:

FIG. 2 is a schematic diagram of the data structures used by the compound locking mechanism.

DETAILED DESCRIPTION OF PREFERRED EMBODIMENT

The DirectTalk Development Work Area

Figure 1:
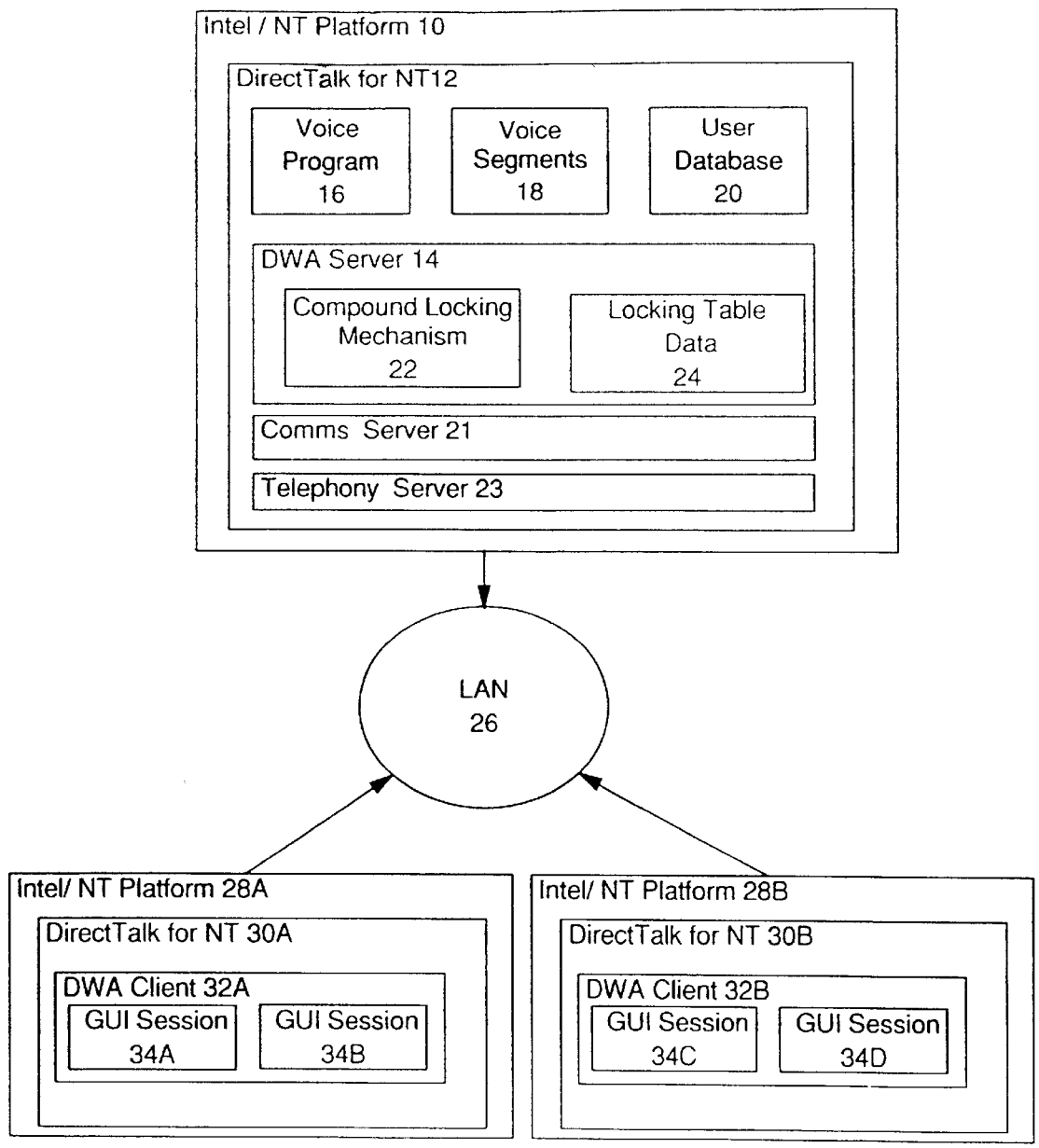
FIG. 1 is a schematic diagram of a voice application environment including a development work area (DWA) and a compound locking mechanism.

The Development Work Area (DWA) is a GUI client application which allows users to easily create and work with components of DirectTalk for Windows NT Voice Application. FIG. 1 is a schematic diagram of a voice application environment running on a Intel/NT platform 10, the voice application 12 is DirectTalk for NT and includes a development work area server for the DWA known as the VAD server 14. The voice application 12 includes a voice program 16 (which defines how the voice application 12 operates and consists of a combination of DirectTalk Actions and REXX programming language instructions), voice segments 18 (recorded voice) and user databases 20 (for sharing data between applications). Some components are stored inside database files, others are stored as standard files. The DWA server 14 comprises a compound locking mechanism 22 and storage for locking data 24. Comms server 21 and Telephony server 23 reside on the platform 10.

The server platform comprises a LAN connection to LAN 26. Also connected to LAN 26 are client platforms 28A and 28B comprising Intel/NT platforms and running DT for NT voice application clients 30A and 30B. The voice application clients comprise DWA clients 32A and 32B and GUI sessions 34A, 34B, 34C and 34D. Not shown in the figures are the associated client hardware attached to the platform such as the keyboard, mouse, VDU.

All DWA GUI session requests from a client (for example, the deletion of a Voice Segment within a Voice Segment database 18) are serviced by a the DWA Server 14. The DWA Server (and associated Voice Application data) can be configured to be on the same PC as the DWA client 32A, 32B or on a different (LAN connected) PC but in the example it is described on a LAN connected server. In the embodiment multiple DWA clients 32*a* AND 32*b* on multiple PCs 28*a* AND 28*b* are be configured to send requests to one single DWA Server 14 (and associated Voice Application data 16, 18, 20). Within certain limits, 2 or more DWA client users can work with different components of the same Voice Application at the same time.

A container could be a file, a database or any set or collection of objects. An object culd be a record, a segment or a line or any identifiable single entity.

A compound (two-tier) locking mechanism has been developed which locks both objects and containers by name. In the embodiment two types of lock may be acquired, either READ or EXCLUSIVE. A process in an application may request access to an object or a container and will indicate which type of access is required (READ or EXCLUSIVE). This access request will be granted or denied according to the current state of the object or container itself and also: if the request is for an object lock, it must take account of the state of the container in which the object resides; or if the request is for a container lock, it must take account of the state of any contained objects.

The compound locking mechanism 22 stores both object and container locks within the same set of tables in the locking data area 24 and is able to resolve the dependencies between the two types of lock (object or container) and the two types of access (read or exclusive). The lock tables themselves are synchronised so that concurrent locking operations do not conflict with each other.

Locking Data

The Lock data comprises a data structure as shown in FIG. 2, the list is shown in table form, lock table 40 but it may also be a linked list or in any other form. Each item to be locked is represented by an entry in the lock table 40 which contains its Name (container name 42) and its Key (object name 44). Single objects (e.g. database records) require both Name (container name 42) and Key (object name 44) to be specified when creating a lock. Collections of objects (e.g. Databases) require the Name (container name 42) only and the key is specified as NULL. Caller identification is stored with each lock as a session id 46. This enables expansion of the lock types and allows current lock holders to be notified if (for example), a higher priority lock was about to be taken by another caller, e.g. Update in progress while existing readers. The unique user session may be identified the GSI path number of the caller (if any) who currently has the item exclusively locked. The GSI is the DirectTalk client/server transport mechanism. The lock table also comprises a Count field 48 which holds the number of times the session has obtained the exclusive lock.

Attached to the lock table 40 are linked records 50A, 50B, 50C for non-exclusive lock data in a linked list. In the embodiment the links are pointers 52A, 52B, 52C are used to link the records together and to the lock table 40. Each record 50A, 50B, 50C represents a session (reader) who has acquired a read lock (non-exclusive lock) on the item in the lock table with which it is linked. The GSI path number of the session who currently has the item locked for read is stored in the session field 54A, 54B, 54C. The number of times the session has obtained the read lock is stored in the count field 56A, 56B, 56C.

Locking Principles

The operations of the DWA require various items to be lockable. The general principles of locking are applicable to most types of object and collections of objects. It should be noted however, that the locking of items is done within the DWA API (known as VAD API) used by the DWA client and not explicitly by the caller or session. Typically, a lock is acquired by VADQueryXXXProperties and is released by VADReleaseXXXAccess. Various functions for each object type check that the necessary lock has been acquired before processing the request. The items which may be locked by the DWA are either single objects or entire collections of objects, e.g. databases or containers.

Each lock is associated with the caller and is identified by the GSI path number of the requester. This caller identification is stored with each lock in session 46 in the lock table or in a linked lock record 50. A single user-application may have several GSI sessions in use and each session will have a unique caller identification. The count 48, 56 is incremented when the session requests a lock on an object which is already locked by the same session. Each use of a lock must be released before the object or collection becomes unlocked, i.e. the use-count must be zero. Locks are intended to be explicitly released by their owner session. However, when a client application ends the VAD session or terminates itself, then any locks associated with the sessions on that client will be released.

An item (object or container) may be locked for read access or locked for exclusive access. If an item is read-locked, then another session may obtain a read-lock on the same item but not an exclusive-lock. If an item is locked for exclusive access, then another session may not obtain any lock on the same item; this applies to both an object and a container. If one caller has an object locked and another session requires a lock on the container in which the object resides (or vice-versa), then a read-lock on the container will be granted but an exclusive-lock would not.

The complete set of combinations of locks between single objects and containers (collections) is shown in Table 1 and Table 2. The check marks (√) show which combinations of locks would be allowable (i.e. granted) between two sessions requesting a lock on either: the same single object; the same collection; or a single object and the collection in which it resides.

TABLE 1

Object and Collection Locking Rules - Different Sessions

|  |  | Object | | | Collection | | |
| --- | --- | --- | --- | --- | --- | --- | --- |
|  |  | Read | Exclusive | None | Read | Exclusive | None |
| Object | Read | √ | — | √ | √ | — | √ |
|  | Exclusive | — | — | √ | √ | — | √ |
|  | None | √ | √ | √ | √ | √ | √ |
| Collection | Read | √ | √ | √ | √ | — | √ |
|  | Exclusive | — | — | √ | — | — | √ |
|  | None | √ | √ | √ | √ | √ | √ |

TABLE 2

Object and Collection Locking Rules - Same Sessions

|  |  | Object | | | Collection | | |
| --- | --- | --- | --- | --- | --- | --- | --- |
|  |  | Read | Exclusive | None | Read | Exclusive | None |
| Object | Read | √ | — | √ | √ | — | √ |
|  | Exclusive | — | √ | √ | √ | — | √ |
|  | None | √ | √ | √ | √ | √ | √ |
| Collection | Read | √ | √ | √ | √ | — | √ |
|  | Exclusive | — | √ | √ | — | √ | √ |
|  | None | √ | √ | √ | √ | √ | √ |

If an exclusive lock is required on a single object, then that object must not be locked by any other user. Also, the container holding the object must not be locked for exclusive access by any other user. It may however, be locked for read-access. If an exclusive lock is required on a container (e.g. while copying the entire database), then none of the contained objects may be locked by any other user. Also, the container itself must be free of all locks.

Multiple users may acquire a read-lock on the same container while browsing its content. Similarly, multiple users may acquire read-locks on a single object to browse its content. The solution maintains knowledge of which user 'owns' each locked entity. It can therefore be used to provide alternative types of lock such as an UPDATE lock whereby existing users holding READ locks could be notified that the data had changed following an update. Multiple locks of the same type may be acquired by the same user. This allows the solution to operate in a workstation-type multithreading environment. Such locks must be released a corresponding number of times before the locked entity is released.

How the locking mechanism is specific to the Application Developer GUI

The compound locking mechanism 22 is specifically designed to support a GUI-based work area in which the user may be working on complete collections of objects (such as databases) and/or on individual objects within these databases. The GUI-based work area is multi-user and is client-based. It will be connected to a server which provides the locking facilities. Each user will have several sessions. Typically, one session would provide the interactive capabilities while another would provide long-running (background) capabilities such as copying an entire database or application.

Each session between the client and the server is assigned a unique identifier (a path number) and it is this path number which is used to identify the lock owner within the locking mechanism. Thus, while the same user would be able to perform several interactive (foreground) operations on the same object (incrementing the use-count of the object lock), he would be prevented from acquiring an exclusive lock on both the interactive and the background sessions. This is achieved by using the session identifier (rather than a user identifier) as the lock owner within the locking mechanism.

Extension of Lock Types Using the User-identifier

In addition to READ and EXCLUSIVE locks, the locking mechanism is extendible to other types of lock such as WRITE. This type of lock would be higher priority than READ but lower than EXCLUSIVE. Write access would be denied if the object or container were already locked with EXCLUSIVE access but would be granted if the object or container had only READ locks. The presence of the user identifier could then be used to notify the existing readers that a write operation was in progress. The readers might then choose to release and reacquire their read lock and to reread the object after it had been updated.

Generic Capabilities

The 'container' and 'object' aspects of this locking mechanism are fully generic. They do not necessarily relate to files within a file system or records within a file, although they are ideally suited to such uses. Conceptual, non-existent or imaginary collections or entities may be locked to suit the application. An example would be to collect a number of files into a 'set'. A name can be given to the set, which is then treated as the container, and the file names could be used as object names. Thus the files can be individually locked and the entire set can also be locked. Similarly, an entire collection of databases (themselves treated as containers) can be locked by grouping them into a set, referenced by (e.g.) the application name. An entire set of application databases could then be locked for maintenance, even though the file system has no knowledge of their linkage to a specific application.

Another example is in the telephony area for which this locking mechanism was designed. A telephone line (one of several on a telephony adapter in an IVR system) will take incoming telephone calls. Associated with each call will be the caller's phone number. The phone number could be used as an object reference and the line number could be used as a container reference. Thus, the compound locking mechanism can be used to create and release locks on individual calls and on lines. A line might be locked in order to take it out of service. A Line+PhoneNumber might be locked for the duration of a call. Once the lock was acquired, the compound lock name could be used as a unique key for a logging system.

Locking Operations

When an entire collection is locked, the contained objects are not themselves locked. However the access logic of object operations will test both the lock state of the object itself and that of the collection in which the object resides. The following examples assume that the locks are held in a table keyed on both the database name and the name of the object. Single object items have both keys defined whereas collection items have just the collection name specified; the object name being NULL.

Once a lock has been acquired, there is no facility to change the type of access (i.e. Read or Exclusive). To change the type of access, the caller must release the lock and re-acquire it as a separate request. The Lock_Item functions outlined below will be performed internally by all VADQueryXXXXProperties API functions.

Lock Object for Exclusive Access

A single object may be locked for exclusive access provided it is currently either unlocked or locked exclusively by the same user and the collection in which it is contained is not locked for exclusive access by another user.

```
LockState ::= READ | EXCLUSIVE | NONE
Lock_Item (db_name,object_name,EXCLUSIVE) ::=
    if (( LockState (db_name,object_name) == NONE
        or LockState (db_name,object_name) == EXCLUSIVE and same user
    ))
    and ( LockState (db_name,NULL) <> EXCLUSIVE
        or LockState (db_name,NULL) == EXCLUSIVE and same user
    )
    then
        LockState (db_name,object_name) = EXCLUSIVE
        Success
    else
        Fail (Resource_Locked)
```

Lock Object for Read Access

A single object may be locked for read access providing it is not currently locked for exclusive access and the collection in which it is contained is not locked for exclusive access.

```
Lock_Item (db_name,object_name,READ) ::=
    if LockState (db_name,object_name) <> EXCLUSIVE
    and LockState (db_name,NULL) <> EXCLUSIVE
    then
        LockState (db_name,object_name) = READ
        Success
    else
        Fail (Resource_Locked)
```

Lock Collection for Exclusive Access

A collection may be locked for exclusive access as long as it is not presently locked at all and by another user and none of the contained objects is locked (except exclusively by the same caller).

```
Lock_Item (db_name,NULL,EXCLUSIVE) ::=
    if ( LockState (db_name,NULL) == NONE
        or LockState (db_name,NULL) == EXCLUSIVE and same user
    )
    and ( LockState (db_name,'✓') == NONE
        or LockState (db_name,'✓') == EXCLUSIVE and same user
    )
    then
        LockState (db_name,NULL) = EXCLUSIVE
        Success
    else
        Fail (Resource_Locked)
```

Lock Collection for Read Access

A collection may be locked for read access as long as it is not already locked for exclusive access. The lock state of any contained objects is not relevant.

```
Lock_Item (db_name,NULL,READ) ::=
    if LockState (db_name,NULL) <> EXCLUSIVE
    then
        LockState (db_name,NULL) = READ
        Success
    else
        Fail (Resource_Locked)
```

Check Access

This function will be performed internally by all API functions which require an object or collection to have a specific degree of access, e.g. SetXXXXProperties, CopyXXX, DeleteXXX etc.

```
Check_Access (db_name,object_name,access,caller) ::=
    if LockState (db_name,object_name) == access
    and LockOwner (db_name,object_name) == caller
        Success
    else
        Fail (Access_Insufficient)
```

Lock Management

VSADSRV will supply locking for resources as required by the API. Locking is done on a composite name consisting of a mandatory database or file name and an optional record key. For example, to lock a Voice Logic Module called "myseg" for US English application "menu", the name "menu_us.vlm" and key "myseg" would be used. Similarly, to lock the whole VLM database, the name "menu_us.vlm" and a key of NULL would be used. The whole database would be locked while a copy or delete operation was in progress. In addition to the explicit API to release a lock, all locks for a session will be released on GS_UNBIND_SERVER.

Non-existent Objects

It is often required to copy an object A to a new object B. If another user is simultaneously copying object C to a new object B, then a conflict occurs. It is therefore required to create locks on non-existent objects (ie. B in this case) so that both the source and the target of a copy operation may be locked before the operation proceeds. This ensures that the second user is unable to lock the target object (even though it does not yet exist) because the first user has already indicated the intent to create it. This technique does not make use of, or depend on, the underlying file system. It may be used irrespective of whether the data is held in files, databases, or (as mentioned above) does not exist at all.

LOCKING EXAMPLES

Example 1

User-1 and User-2 both open the Development Work Area on separate client machines. Each will have three sessions (User-1 has sessions 1,2 and 3 and User-2 has sessions 4,5 and 6). Typically, the primary session for each user (ie. 1 or 4) is used for interactive operations and the others (2,3 and 5,6) are used for background operations. User-1 opens object "voice_seg_one" in database "voice_db" for update. Intention is to view and update the data associated with the segment so an exclusive lock is acquired.

| Lock Table | | Exclusive | |
|---|---|---|---|
| Container | Object | Count | Session |
| voice_db | voice_seg_one | 1 | 1 |

User-1 opens same object again. Intention is to play the audio from the voice segment. The work area uses the same session so the exclusive use-count is incremented.

| Lock Table | | Exclusive | |
|---|---|---|---|
| Container | Object | Count | Session |
| voice_db | voice_seg_one | 2 | 1 |

User-1 attempts to delete the object. This is performed on a separate session (e.g. 2) and therefore access is denied because the object is already locked by another session. User-2 attempt to open the object. Access is denied because the session id does not match. User-2 attempts to copy the entire container "voice_db". This requires an exclusive lock on the container. Although "voice_db" itself is not locked, the lock table indicates than a contained object is locked. Therefore, access is denied. Eventually, User-1 releases both locks on the object and when the use-count reaches zero, the lock entry is removed from the table.

Example 2

User-1 is copying or deleting the container "voice_db". This requires an exclusive lock which would normally be acquired on one of the background sessions.

| Lock Table | | Exclusive | |
|---|---|---|---|
| Container | Object | Count | Session |
| voice_db | — | 1 | 2 |

User-2 now tries to acquire a lock on one of the contained objects specifying the compound reference of ("voice_db", "voice_seg_one"). The locking mechanism determines that although the named object is not locked, the container holding it is locked. Access is therefore denied.

Example 3

User-1 requires a list of the contents of a container. It acquires a head lock on the container.

| Lock Table | | Exclusive | | Readers | |
|---|---|---|---|---|---|
| Container | Object | Count | Session | Count | Session |
| voice_db | — | 0 | 0 | 1 | 1 |

User-2 also requires a list of the contents of a container. It acquires a read lock on the same container.

| Lock Table | | Exclusive | | Readers | | | |
|---|---|---|---|---|---|---|---|
| Container | Object | Count | Session | Count | Session | Count | Session |
| voice_db | — | 0 | 0 | 1 | 1 | 1 | 4 |

User-1 now requires an exclusive lock on one of the objects from its list.

| Lock Table | | Exclusive | | Readers | | | |
|---|---|---|---|---|---|---|---|
| Container | Object | Count | Session | Count | Session | Count | Session |
| voice_db | — | 0 | 0 | 1 | 1 | 1 | 4 |
| voice_db | "voice_seg_one" | 1 | 1 | | | | |

User-2 now requires an exclusive lock on a different object from the same list.

| Lock Table | | Exclusive | | Readers | | | |
|---|---|---|---|---|---|---|---|
| Container | Object | Count | Session | Count | Session | Count | Session |
| voice_db | — | 0 | 0 | 1 | 1 | 1 | 4 |
| voice_db | "voice_seg_one" | 1 | 1 | | | | |
| voice_db | "voice_seg_two" | 1 | 4 | | | | |

At this point, both users have a read lock on the same container. Each user also has an exclusive lock on an object. Any of the users could acquire multiple locks on objects or containers which they already have locked by using the same session. This might occur, for example, if User-1 opens a second list of the same container.

Otherwise, no user may acquire exclusive or read locks on the two locked objects. No user may acquire an exclusive lock on the container because: a) It is already locked for read by two sessions; b) It has contained objects which are locked.

Any user may acquire a read lock on the container. If both users release their container locks but retain their object locks, the table looks like this:—

| Lock Table | | Exclusive | | Readers | | | |
|---|---|---|---|---|---|---|---|
| Container | Object | Count | Session | Count | Session | Count | Session |
| voice_db | "voice_seg_one" | 1 | 1 | | | | |
| voice_db | "voice_seg_two" | 1 | 4 | | | | |

It is still impossible for any user to acquire an exclusive lock on "voice_db" because there remain individual object locks within that container. Only when all object locks are released could a user then acquire an exclusive lock on the container.

In this example the platform uses an Intel based microprocessor and Windows NT operating system but there is no reason why another platform and operating system be used if a suitable voice application would operate on it. This example uses IBM DirectTalk for NT voice application but there is no reason why IBM DirectTalk for any other platform or any other voice application may be used.

Intel is a trademark of Intel Corporation. Windows NT is a trademark of Microsoft Corporation. DirectTalk is a trademark of IBM Corporation.

Now that the invention has been described by way of a preferred embodiment, various modifications and improvements will occur to those person skilled in the art. Therefore it should be understood that the preferred embodiment has been provided as an example and not as a limitation.

What is claimed is:

1. A method of controlling access to objects and containers, each representing a group of objects, in a multi-user environment whereby lock states of the objects and lock states of the containers are stored in a computer system, said method comprising the steps of:

accepting a request from a user for access to an object and a container, wherein each of said users has multiple sessions, and each of said sessions can own different lock states;

deciding access to the object and container based on: the lock state owned by one of said sessions for that object or container; and either, the lock state of a container if the request is for an object contained within that container, or the lock state of objects grouped within a container if the request is for a container wherein said container comprise real containers and conceptual containers; and sending a message to the requester granting or denying access to said object or said container.

2. A method as claimed in claim 1 further comprising storing the lock states for containers and lock states for objects in a common format.

3. A method as claimed in claim 2 wherein the lock state for a container or an object is stored in a record in a table.

4. A method as claimed in claim 3 wherein the record comprises a container name field and an object name field containing a string expression.

5. A method as claimed in claim 4 wherein the lock state stored is an exclusive lock.

6. A method as claimed in claim 5 whereby the lock state comprises a non-exclusive lock state associated with a user session.

7. A method as claim in claim 6 wherein the non-exclusive lock state comprises a read lock.

8. A method as claimed in claim 7 wherein more than one non-exclusive lock state may be associated with a lock entry.

9. A method as claim in claim 8 wherein multiple non-exclusive lock states may be stored in a linked list comprising linked records associated with record in a lock table.

10. A method of controlling access to objects and containers stored in a multi-user computer system comprising:

providing users access to said objects and containers;

identifying multiple sessions for each of said users accessing said objects and containers, wherein each of said sessions can own different lock status; and restricting said access to said objects and containers based on the lock state owned by one of said sessions for that object or container; and either, the lock state of a container if the request is for an object contained within that container, or the lock state of objects grouped within a container if the request is for a container, wherein said container comprise real containers and conceptual containers.

11. The method in claim 10, wherein said sessions comprise at least one of an interactive session and a background session.

12. The method in claim 11 further comprising preventing a user from acquiring an exclusive lock on both said interactive session and said background session with respect to a given object.

13. The method in claim 10, wherein said objects comprise real objects and conceptual objects.

14. The method in claim 10, wherein said locks restrict access to said objects and collections of said objects.

15. The method in claim 14, wherein said locks for said objects and said collection have the same format.

16. A method of controlling access to objects and containers stored in a multi-user computer system comprising:

providing users access to said objects and containers;

identifying multiple sessions for each of said users accessing said objects and containers, wherein each of said sessions has a unique session identifier, and each of said sessions can own different lock states; and restricting said access to said objects and containers using locks, wherein each of said locks is owned by one session identifier for that object or container; and either, the lock state of a container if the request is for an object contained within that container, or the lock state of objects grouped within a container if the request is for a container, wherein said container comprise real containers and conceptual containers.

17. The method in claim 16, wherein said sessions comprise at least one of an interactive session and a background session.

18. The method in claim 17, further comprising preventing a used from acquiring an exclusive lock on both said interactive session and said background session with respect to a given object.

19. The method in claim 16, wherein said objects comprise real objects and conceptual objects.

20. The method in claim 16, wherein said locks restrict access to said objects and collections of said objects.

21. A method of controlling access to entities in a multi-user environment whereby the entities are containers and objects, and lock states of the entities are stored in a common format comprising a record for a container name and a corresponding object name in a common database, said method comprising the steps of:

accepting an access request from a requestor for access to an entity wherein each requestor has multiple sessions, and each of said sessions can own different lock states;

deciding access to the entity based on: the lock state of that object or container; and either, the lock state of the container if the request is for an object contained within a container, or the lock state of the objects grouped within a container it the request is for a container;

wherein sad container comprise real containers and conceptual containers;

sending a message to the requestor granting or denying access to said entity; and storing, if access is granted, a new lock state for the entity in the common format, wherein, because said states of said containers and said objects are stored in said common format, the same access request may be performed on any entity irrespective of whether the entity is a container or an object.

* * * * *